United States Patent
Pedersen et al.

(10) Patent No.: US 10,275,049 B2
(45) Date of Patent: Apr. 30, 2019

(54) STYLUS SIGNALING FOR CAPACITIVE TOUCH SCREEN PANELS

(71) Applicant: NVIDIA Corporation, Santa Clara, CA (US)

(72) Inventors: Christen Kent Pedersen, Sunnyvale, CA (US); Arman Toorians, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 418 days.

(21) Appl. No.: 14/250,254

(22) Filed: Apr. 10, 2014

(65) Prior Publication Data

US 2014/0306928 A1    Oct. 16, 2014

Related U.S. Application Data

(60) Provisional application No. 61/810,997, filed on Apr. 11, 2013, provisional application No. 61/810,578, filed on Apr. 10, 2013.

(51) Int. Cl.
*G06F 3/0354* (2013.01)
*G06F 3/041* (2006.01)
*G06F 3/044* (2006.01)

(52) U.S. Cl.
CPC .......... *G06F 3/03545* (2013.01); *G06F 3/044* (2013.01); *G06F 3/0416* (2013.01)

(58) Field of Classification Search
CPC ............. G06F 3/03545; G06F 3/04883; G06F 3/04886; G06F 3/0416; G06F 3/044
See application file for complete search history.

(56) References Cited

U.S. PATENT DOCUMENTS

| | | | | |
|---|---|---|---|---|
| 5,661,269 A | * | 8/1997 | Fukuzaki | G06F 3/046 178/19.06 |
| 5,877,459 A | * | 3/1999 | Prater | G06F 3/044 178/19.01 |
| 5,914,708 A | * | 6/1999 | LaGrange | G06F 3/03545 178/18.06 |
| 5,995,081 A | | 11/1999 | Kato | |
| 8,493,359 B2 | * | 7/2013 | Wright | G06F 3/03545 178/18.06 |
| 8,648,837 B1 | * | 2/2014 | Tran | G06F 3/0416 178/19.01 |
| 8,780,065 B2 | * | 7/2014 | Ribeiro | G06F 3/0412 345/173 |

(Continued)

*Primary Examiner* — Ricardo Osorio
(74) *Attorney, Agent, or Firm* — Brian Lee; Parker Justiss, P.C.

(57) ABSTRACT

Signaling touch screen enabled devices is disclosed. A capacitive stylus has a body suitable for being hand held as a writing instrument. The body has a tip for interfacing with a capacitive touch screen display panel of a computer system. The stylus has an insulator disposed near its tip, which insulates capacitance of the stylus body. A switch selectively couples the tip to the remaining parts of the stylus body. A controller controls the switch. A mode selector on the body is responsive to being pressed to signal the controller for selecting one of multiple modes. The controller is configured to enter the selected mode responsive to the mode selector and is configured to control the switch unit to switch according to different signal patterns depending on a mode entered by the controller.

20 Claims, 16 Drawing Sheets

(56) References Cited

U.S. PATENT DOCUMENTS

| | | | |
|---|---|---|---|
| 9,760,187 B2* | 9/2017 | Havilio | G06F 3/03545 |
| 2003/0107607 A1 | 6/2003 | Nguyen | |
| 2004/0100457 A1 | 5/2004 | Mandel | |
| 2004/0212586 A1 | 10/2004 | Denny, III | |
| 2007/0103455 A1 | 5/2007 | Omata et al. | |
| 2009/0167727 A1 | 7/2009 | Liu et al. | |
| 2009/0262637 A1 | 10/2009 | Badaye et al. | |
| 2010/0051356 A1* | 3/2010 | Stern | G06F 3/03545 178/19.04 |
| 2010/0085325 A1* | 4/2010 | King-Smith | G06F 3/03545 345/174 |
| 2010/0170726 A1* | 7/2010 | Yeh | G06F 3/044 178/19.03 |
| 2010/0315384 A1* | 12/2010 | Hargreaves | G06F 3/044 345/179 |
| 2011/0169756 A1* | 7/2011 | Ogawa | G06F 3/03545 345/173 |
| 2011/0261026 A1 | 10/2011 | Kim et al. | |
| 2011/0273376 A1 | 11/2011 | Dickinson et al. | |
| 2011/0304577 A1 | 12/2011 | Brown et al. | |
| 2012/0146957 A1 | 6/2012 | Dunagan | |
| 2012/0153424 A1 | 6/2012 | Wright et al. | |
| 2012/0223894 A1 | 9/2012 | Zhao et al. | |
| 2012/0327041 A1 | 12/2012 | Harley et al. | |
| 2012/0327045 A1* | 12/2012 | Skinner | G06F 3/03545 345/179 |
| 2013/0038339 A1 | 2/2013 | Peterson et al. | |
| 2013/0044078 A1 | 2/2013 | Hallenberg et al. | |
| 2013/0082937 A1 | 4/2013 | Liu et al. | |
| 2013/0100071 A1 | 4/2013 | Wright et al. | |
| 2013/0135191 A1 | 5/2013 | Shiokawa | |
| 2013/0194242 A1 | 8/2013 | Park et al. | |
| 2013/0249823 A1* | 9/2013 | Ahn | G06F 3/038 345/173 |
| 2014/0028633 A1 | 1/2014 | Mercea et al. | |
| 2014/0035884 A1 | 2/2014 | Oh et al. | |
| 2014/0043245 A1 | 2/2014 | Dowd et al. | |
| 2014/0043547 A1* | 2/2014 | Marhefka | G06F 3/046 349/12 |
| 2014/0092055 A1 | 4/2014 | Radivojevic et al. | |
| 2014/0160091 A1* | 6/2014 | Mann | G06F 3/0383 345/179 |
| 2014/0168142 A1* | 6/2014 | Sasselli | G06F 3/0416 345/174 |
| 2014/0168177 A1 | 6/2014 | Mkrtchyan et al. | |
| 2014/0176495 A1* | 6/2014 | Vlasov | G06F 3/044 345/174 |
| 2014/0253464 A1 | 9/2014 | Hicks et al. | |
| 2014/0267078 A1 | 9/2014 | Kukulski et al. | |
| 2014/0267180 A1* | 9/2014 | Buelow | G06F 3/044 345/179 |
| 2014/0267187 A1* | 9/2014 | Cooke | G06F 3/044 345/179 |
| 2014/0267192 A1* | 9/2014 | Matsuura | G06F 3/03546 345/179 |
| 2014/0306929 A1* | 10/2014 | Huang | G06F 3/03545 345/174 |
| 2015/0015497 A1 | 1/2015 | Leigh | |
| 2015/0029163 A1 | 1/2015 | Harris et al. | |
| 2015/0070330 A1 | 3/2015 | Stern | |
| 2015/0116289 A1 | 4/2015 | Stern et al. | |
| 2015/0205406 A1 | 7/2015 | Zhou et al. | |
| 2016/0266663 A1 | 9/2016 | Holsen | |
| 2016/0349897 A1 | 12/2016 | Ishikawa | |
| 2017/0255319 A1 | 9/2017 | Winebrand et al. | |
| 2018/0046268 A1 | 2/2018 | Keidar et al. | |
| 2018/0196533 A1 | 7/2018 | Zeliff et al. | |

\* cited by examiner

EXAMPLE TIP SET
60
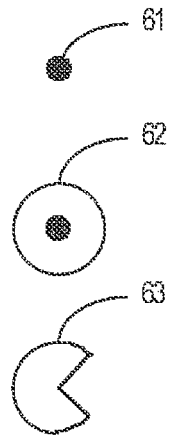
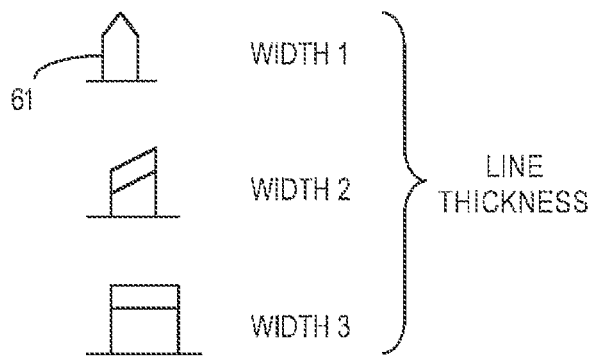
TIPS:
LINE THICKNESS
ERASER FUNCTION 
 BLUE
 RED
 GREEN
FIG. 6

STYLUS SIGNALING FOR CAPACITIVE TOUCH SCREEN PANELS

RELATED U.S. APPLICATIONS AND BENEFIT CLAIM

The present Application claims the benefit of priority to related co-pending Provisional U.S. Patent Application No. 61/810,997 filed Apr. 11, 2013 by Christen Kent Pedersen and Arman Toorians for Pen Signaling for Capacitive Touch Panels, which is incorporated by reference for all purposes as if fully set forth herein.

The present Application claims the benefit of priority to related co-pending Provisional U.S. Patent Application No. 61/810,578 filed Apr. 10, 2013 by Jen-Hsun Huang and Arman Toorians for Methods for Operation a Touch Screen Enabled Device with a Low Cost Stylus, which is incorporated by reference for all purposes as if fully set forth herein.

TECHNOLOGY

Embodiments of the present invention relate generally to electronic devices with interactive displays. More specifically, example embodiments of the present invention relate to touch screen enabled electronic devices and styli for same.

BACKGROUND

Touch screens comprise user-interactive electronic displays. Touch screens provide graphical user interface (GUI) operability by direct user interactions with portions of the information being displayed. The user interactions allow direct user control over selecting information to be displayed on the touch screen and the appearance of the displayed information, including electronic drawing applications. As touch screens obviate components otherwise needed for GUI functionality, they are particularly useful in small form factor, lightweight, often battery-powered electronic devices such as smart phones and tablet computers, etc. Various types of touch screens are in current use.

Capacitive touch screens have superior accuracy and responsiveness characteristics relative to other common types. Capacitive touch screen displays have an electrically insulating transparent display surface such as glass or plastic covered by an array of transparent (or microscopic) conductors, which develop an electrostatic field over the display surface. Users may interact with capacitive touch screens using their finger digits or a pen type or stylus device. Styli, pens and fingers have their own capacitance or active characteristics, which effectively enable and affect their use for signaling with the touch screen display. When a user touches (or in some cases, nearly touches or gestures in proximity with) the display surface with the stylus or finger, the electrostatic field is distorted detectably by the capacitance caused by the interaction.

The distortion in the electrostatic field may be detected as a measured change in a capacitance value at the horizontal (x-axis) and vertical (y-axis) position of contact of the stylus or finger with respect to the planar rectangular display surface. The position of contact may correspond to the position of at least a pixel in an interactive image rendered on the display.

For example, a box shaped image feature labeled "enter," "go," "yes" or "no," "get," "cancel," "stop," etc. shown in the rendered screen image may comprise a GUI "button" with which a corresponding user input is actuated by touching the box with the stylus or finger. The user input corresponding to a programmed selection is sent to a controller module based on the touch at the detected location. The controller may be operable for calling, triggering, initiating, controlling, computing, performing, executing or halting a processing function corresponding to the programmed selection.

The terms "pen" and "stylus" (and their respective plurals "pens" and "styli") may be used herein synonymously, interchangeably and/or equivalently. Capacitive and active pens are in current use, each of which typically operates over an upper surface of a capacitive touch screen. Capacitive pens (also called "passive" pens) are typically operable in contact with the touch screen surface.

Capacitive pens are implemented conventionally by scanning lines and thereby detecting an area or region of a part of the screen over which the pen top contacts the surface, the (x, y) coordinates of a centroid of the detected contact area and a size "z" of a circle with which a tip of the pen makes contact with the screen surface. Conventional capacitive pens are operable for reporting simply the detected area, (x, y) centroid coordinates and z size to an operating system (OS) of the touch screen device and applications running therewith. While conventional capacitive pens are operable for effectively substituting for a user's finger to signal the touch screen panel, they lack capability for reporting additional information or communicating a change from one mode of operation, such as "writing," to another mode of operation, such as "erasing."

Current active pens on the other hand may be operably implemented to report additional information, unavailable from conventional capacitive pens, which may be useful to the touch screen device OS and/or applications. For example, active pens are operable for communicating a change from one mode of operation to another, such as from "writing" to "erasing." Additional useful information active pens may report include data relating to the shape of a tip of the pen, an angle of the pen tip relative to the touch screen surface, one or more "buttons" or other operable feature actuators of the active pen. The actuators enable or trigger special or specific features available from the active pen. The special features available from active pens may include an operable eraser feature, writing color selection, type selection, model or characteristic selectivity, pressure data, tip weight or thickness selectivity and/or data relating to an angle of the longitudinal axis of the pen as it is held or maneuvered by the user relative to the planar surface of the touch screen.

While such additional information and mode changes current active pens can report may be useful, the active pens are significantly more expensive than capacitive pens. Moreover, active pens require associated active circuits and communicative interconnectivity such as a dedicated wireless radio or infrared channel for data exchange with the pad device, which adds undesirable complexity as well as higher cost.

Approaches described in this section may, but have not necessarily been conceived or pursued previously. Unless otherwise indicated, approaches mentioned (or issues identified in relation thereto) should not to be assumed as admitted or as recognized in any alleged prior art merely by inclusion in this section.

SUMMARY

It would be useful to increase the signaling operability of capacitive styli for actuating standard capacitive touch screen display panels without adding complexity to the interactive touch screen system or incurring significant additional expense. It would also be useful to provide a capacitive stylus configurably operable for interacting with a capacitive touch screen display over multiple independently selectable features without requiring an intermediating communication device, and which is inexpensive relative to typical active styli. Further, it would be useful to provide a touch sensitive interactive system in which user inputs from an inexpensive capacitive stylus are made without requiring intermediating communication to a touch screen display device to selectively engage various independently available operability features of the stylus.

An example embodiment of the present invention relates to signaling touch screen enabled electronic devices and increases the signaling operability of capacitive styli for actuating standard capacitive touch screen display panels without adding complexity to the interactive touch screen system or significant additional cost. An example embodiment of the present invention provides a capacitive stylus, which is inexpensive relative to typical active styli and configurably operable for interacting with a capacitive touch screen display over multiple independently selectable features without an intermediating communication device. An example embodiment of the present invention provides a touch sensitive interactive system in which user inputs from an inexpensive capacitive stylus are made without intermediating communication to a touch screen display device for selectively engaging various independently available operability features of the stylus.

More specifically, an example embodiment of the present invention relates to signaling touch screen enabled electronic devices with a capacitive electronic stylus having a body suitable for being hand held as a writing instrument. The body has a tip for interfacing with a capacitive touch screen display panel of a computer system. The electronic stylus has an insulator, which insulates electrical capacitance of the stylus body. The insulator is disposed near the tip of the stylus. A switch unit selectively couples the tip to the remaining parts of the stylus body. A controller component controls the switch unit. A mode selector is disposed on the body. The mode selector is responsive to being pressed by a user's finger (for instance) to signal the controller for selecting one of multiple modes. The controller is configured to enter the selected mode responsive to the mode selector. The controller is configured to control the switch unit to switch in accordance with different signal patterns depending on a mode entered by the controller.

In an example embodiment, each of the multiple modes may correspond to rendering a distinct representation of a particular pen writing color from among multiple selectable different color representations. The multiple different signal patterns may each comprise square signal waves of a single frequency, but which vary by their individual duty cycle. The multiple different signal patterns may also each comprise square signal waves that share a particular duty cycle, but which vary by their individual frequency.

The mode selector may be implemented with a mechanical or electromechanical button and an associated set of contacts. A display housed on the body may present an indicator representative of a current mode of the controller.

When a particular signal is implemented by the switch and the stylus tip contacts a capacitive touch sensor, the sensor can detect the signal and an application operable on a computer system can implement a software function associated with the signal, such as a color selection.

BRIEF DESCRIPTION OF THE DRAWINGS

FIG. 6 depicts example pen tips, according to an embodiment of the present invention.

DESCRIPTION OF EXAMPLE EMBODIMENTS

Figure 1A:
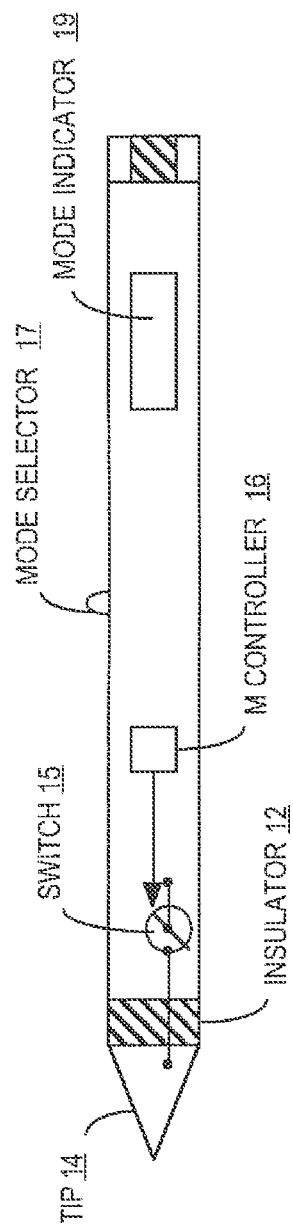
FIG. 1A depicts an example capacitive stylus, according to an embodiment of the present invention.

Example embodiments of the present invention are described below in relation to signaling touch screen enabled electronic devices. The description of example embodiments includes computer implemented methods, computer systems with interactive touch screen displays, and styli and related pen like devices for interacting therewith. Reference will now be made in detail to implementations of the example embodiments as illustrated in the accompanying drawings. The same reference numbers will be used to the extent possible throughout the drawings and the following description to refer to the same or like items. It should be apparent to artisans of ordinary skill in technologies that relate to computer systems and interactive displays, graphical user interfaces (GUIs) and other electronic fields however, that example embodiments of the present invention may be practiced without some of these specifically described details. Example embodiments of the present invention are described in relation to computer implemented methods, computer systems and devices for interacting therewith for signaling touch screen enabled electronic devices.

For focus, clarity and brevity, as well as to avoid unnecessarily occluding, obscuring, obstructing or obfuscating features that may be somewhat more germane to, or significant in explaining example embodiments of the present invention, this description may avoid describing some well-known processes, structures, components and devices in exhaustive detail. Artisans of ordinarily skill in technologies related to computers, GUIs, touch screen display devices and other interactive electronic devices should realize that the following description is made for purposes of explanation and illustration and is not intended to be limiting in any way. On the contrary; other embodiments should readily suggest themselves to artisans of such skill in relation to the example features and elements described herein and any corresponding benefits such embodiments may achieve. An example embodiment of the present invention is described in relation to in relation to a computer implemented method, computer system, devices for interacting therewith for signaling touch screen enabled electronic devices, such as computers with capacitive touch screen displays.

An example embodiment of the present invention relates to signaling touch screen enabled electronic devices with a capacitive electronic stylus having a body suitable for being hand held as a writing instrument. The body has a tip for interfacing with a capacitive touch screen display panel of a computer system. The electronic stylus has an insulator, which insulates electrical capacitance of the stylus body. The insulator is disposed near the tip of the stylus. A switch unit selectively couples the tip to the remaining parts of the stylus body. A controller component controls the switch unit. A mode selector is disposed on the body. The mode selector is responsive to being pressed by a user's finger to signal the controller for selecting one of multiple modes. The controller is configured to enter the selected mode responsive to the mode selector. The controller is configured to control the switch unit to switch in accordance with different signal patterns depending on a mode entered by the controller. A selected signal pattern can be detected by a capacitive touch surface when the stylus interacts therewith.

Example Electronic Stylus

FIG. 1A depicts an example electronic stylus 10, according to an example embodiment of the present invention. The electronic stylus 10 comprises a body 11 suitable for being hand held by a user as a writing instrument.

The body 11 comprises a tip 14 at one end for interfacing with a touch panel, wherein the tip 14 touches a portion thereof. An insulator 12 disposed near the tip 14 insulates capacitance of the body 11 from the tip 14. A switch unit 15 selectively couples the tip 14 electrically to a remainder portion of the body 11 opposite from the tip 14 in relation to the insulator 12.

A controller 16, such as a microcontroller or a field programmable gate array (FPGA), controls an operation of the switch unit 15. A mode selector 17 is disposed on the body 11. In an example embodiment, the mode selector 17 is operably responsive to an actuating pressure made by a user of the electronic stylus 10 to signal the controller 16.

Figure 1B:
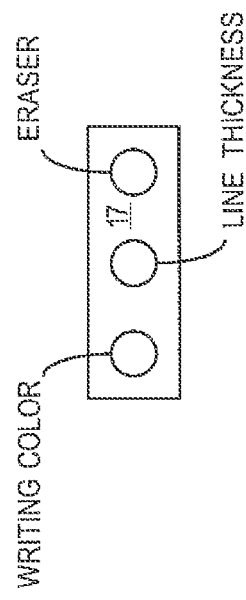
FIG. 1B depicts an example selector, according to an embodiment of the present invention.

The mode selector 17 may comprise a single mechanical or electromechanical button, dial, or similar actuating mechanism, which may actuate an associated array of electrical contacts disposed within the body 11. The mode selector 17 may comprise a plurality of mechanical or electromechanical buttons, which may each actuate a separate corresponding electrical contact. FIG. 1B depicts another example mode selector 17, according to an embodiment of the present invention. The mode selector 17 comprises individual buttons, each with assigned functionality.

The controller 16 is configured or programmed to enter one of multiple (a plurality of) modes responsive to the signal of the mode selector 17. The controller 16 is configured or programmed to control the switch unit 15 to switch in accordance with different signal patterns depending on a mode entered by the controller 16. The electronic stylus 10 may further comprise a display housed on the body 11. The display is operable for presenting a representative indication of a current mode of the controller 16 or other useful indicia.

An example embodiment may be implemented in which the multiple modes correspond to multiple different writing color representations, with which the stylus 10 may write on the surface of the touch screen display when enabled with a drawing application. The different signal patterns may comprise square signal waves of a certain frequency, which vary from each other by their individual duty cycles to indicate different color values. The different signal patterns may also comprise square signal waves having a given duty cycle, which vary from each other by their individual frequency to indicate different color values.

Example Touch Sensitive Computer System

Figure 2:
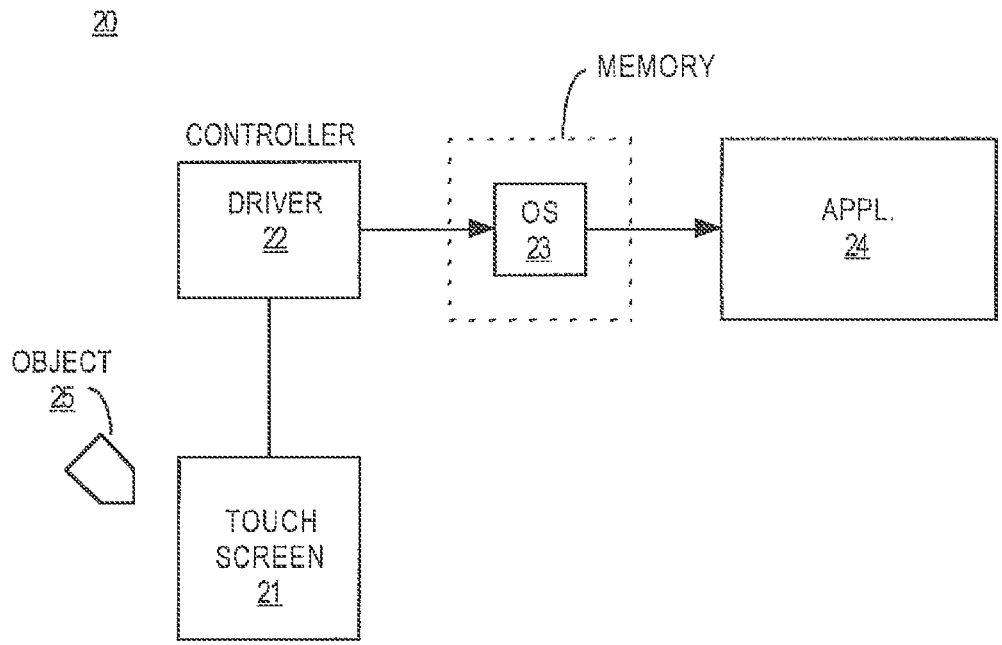
FIG. 2 depicts an example computer system, according to an embodiment of the present invention.

FIG. 2 depicts an example touch sensitive computer system 20, according to an embodiment of the present invention. The touch sensitive system 20 comprises a capacitive touch screen display panel 21 and a controller 22 coupled to scan the capacitance touch display panel 21 for detecting capacitance thereof.

Control logic 23 is coupled to the controller 22 for detecting a position of an interaction of an object 25 with the capacitive touch display panel 21, relative to its substantially rectangular touch sensitive surface. Responsive to the detection of the position of the interaction with the object 25, the control logic 23 is operable for reporting a corresponding horizontal/vertical (x, y) position thereof.

The control logic 23 is operable in combination with the controller 22 for detecting a capacitive signal pattern originating from the object 25. Responsive to the detection of the capacitive signal pattern, the control logic 23 is operable for reporting a type corresponding to the signal, with which the signal is characterized. The type signal may comprise a color type. In this manner, different color values may be selected by the pen interface and communicated to the computer system by the signal pattern. The object 25 may comprise a stylus and the color type may correspond to a color with which the stylus may write to the touch sensitive display panel 21. A selected color pattern may be maintained until changed via a new selection and a new pattern implemented.

An example embodiment may be implemented in which the capacitive signal pattern comprises a square wave of a prescribed duty cycle and/or a square wave of a prescribed frequency. Different signal patterns may each comprise square signal waves of a certain frequency, which vary from each other by their individual duty cycles. Different signal patterns may also comprise square signal waves, each of which has a given duty cycle but varies from the other square wave signals by a unique individual frequency.

The control logic 23 and the controller 22 are operable in combination for detecting an area of a portion of the surface of the touch sensitive display panel 21 over which the object 25 interaction therewith. Responsive to the detection of the area of the interaction, the control logic is further operable for reporting a magnitude corresponding to the interaction.

In an example embodiment, the touch sensitive system 20 further comprises a processor 27 and a memory 28 coupled thereto. An operating system (OS) 29 resides in the memory 28 and is executed by the processor 27. The control logic 23 reports the detected (x, y) position and the type of the signal to the OS 29, (x, y, type).

Figure 3:
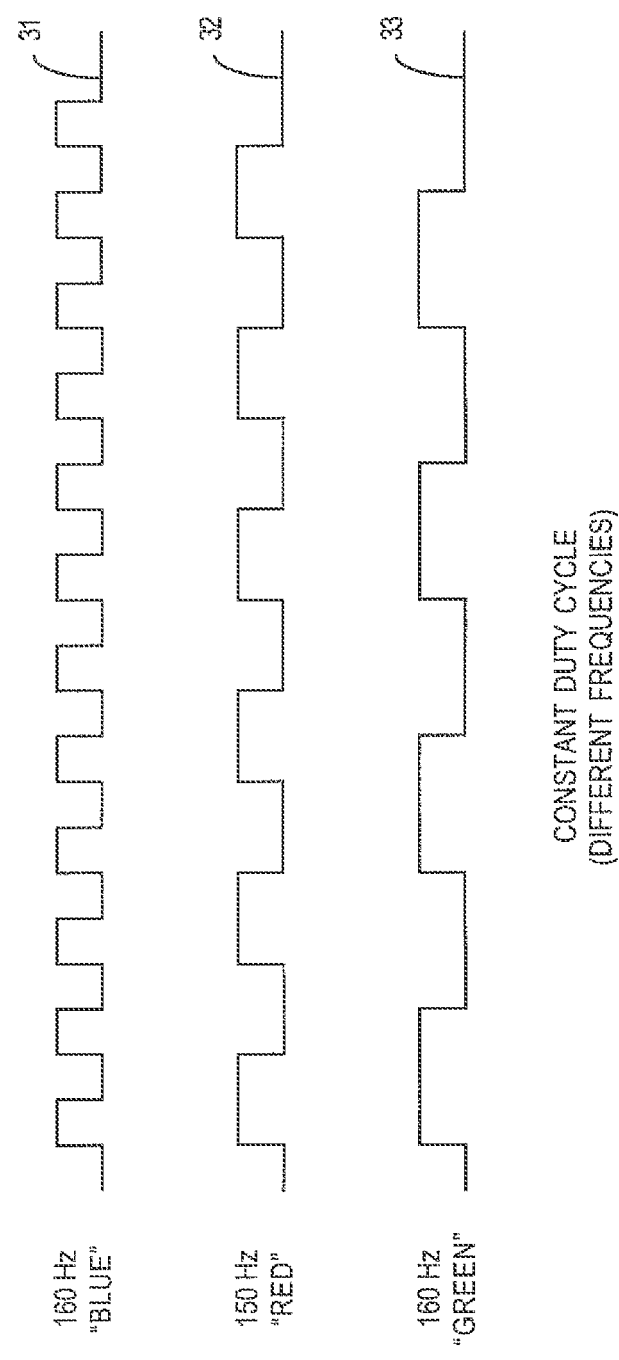
FIG. 3 depicts example signals, according to an embodiment of the present invention.

FIG. 3 depicts a waveform of an example set 30 of type signals, according to an example embodiment of the present invention. The set 30 of type signals comprises a first type signal 31, a second type signal 32 and a third type signal 33, each of which has the same duty factor but a different frequency. Each of the different frequencies corresponds to a separate color representation.

For example, the first signal type 31 has a frequency of 140 Hertz (Hz), which may correspond to rendering a representation of a blue color on the capacitive touch screen display panel. The second signal type 32 has a frequency of 150 Hz, which may correspond to rendering a representation of a red color on the capacitive touch screen display panel. The third signal type 33 has a frequency of 160 Hz, which may correspond to rendering a representation of a green color on the capacitive touch screen display panel. The signal frequency selected should be less than half of the touch sensitive panel's update frequency, e.g., 300 Hz.

Other colors may be represented by signal types having other frequencies, and sharing the same duty cycle. Other frequencies may be implemented with the same duty cycle.

Figure 4:
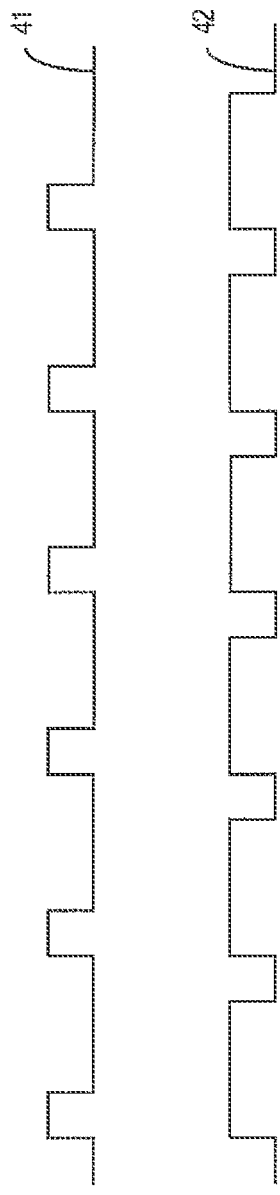
FIG. 4 depicts example signals, according to an embodiment of the present invention.

FIG. 4 depicts a waveform of an example set 40 of type signals, according to an example embodiment of the present invention. The set 40 of type signals comprises a fourth type signal 41, and a fifth type signal 42, each of which has the same frequency (e.g., 150 Hz) but a different duty cycle. Each of the different duty cycles may correspond to a separate operability function.

For example, the fourth signal type 41 has a lower duty cycle than the fifth type signal 42 and may correspond to an operable writing function. The fifth signal type 42 has a higher duty cycle than the fourth type signal 41 and may correspond to an erasing function. Other operating functions may be represented by type signals having other duty cycles that share a particular frequency, and other frequencies may be used.

Figure 5:
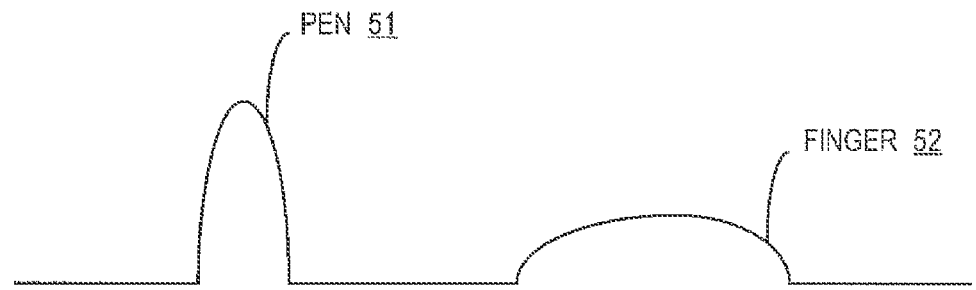
FIG. 5 depicts example signals, according to an embodiment of the present invention.

FIG. 5 depicts an example set 50 of waveforms corresponding to separate capacitive input signals, according to an example embodiment of the present invention. The set 50 of waveforms has a first waveform 51 and a second waveform 52. The first waveform 51 corresponds to an input to a capacitive touch screen display device by a capacitive stylus. In contrast, the second waveform 52 corresponds to an input to a capacitive touch screen display device by a finger of a user.

FIG. 6 depicts a set 60 of example pen tips for a capacitive stylus, according to an example embodiment of the present invention. The set 60 of example pen tips comprises a first tip 61, a second tip 62 and a third tip 63. The first tip 61 may have a lower area of contact with the surface of a capacitive touch screen display than the second tip 62 and/or the third tip 63. The first tip 61 may input thus input a first type signal, which may relate to a writing function.

Each of the second tip 62 and/or the third tip 63 may have a higher area of contact with the surface of a capacitive touch screen display than the first tip 61, and/or a shape covering a contact area different than the shape of the first tip 61. The second tip 62 may input thus input a second type signal, which may relate to an eraser operating function and/or the third tip 63 may thus input a third type signal, which may relate to another operating function. The tips are distinguishable from each other via the area of contact mode by each against the surface of the touch sensitive screen.

Example Computer Implemented Processes

Figure 7:
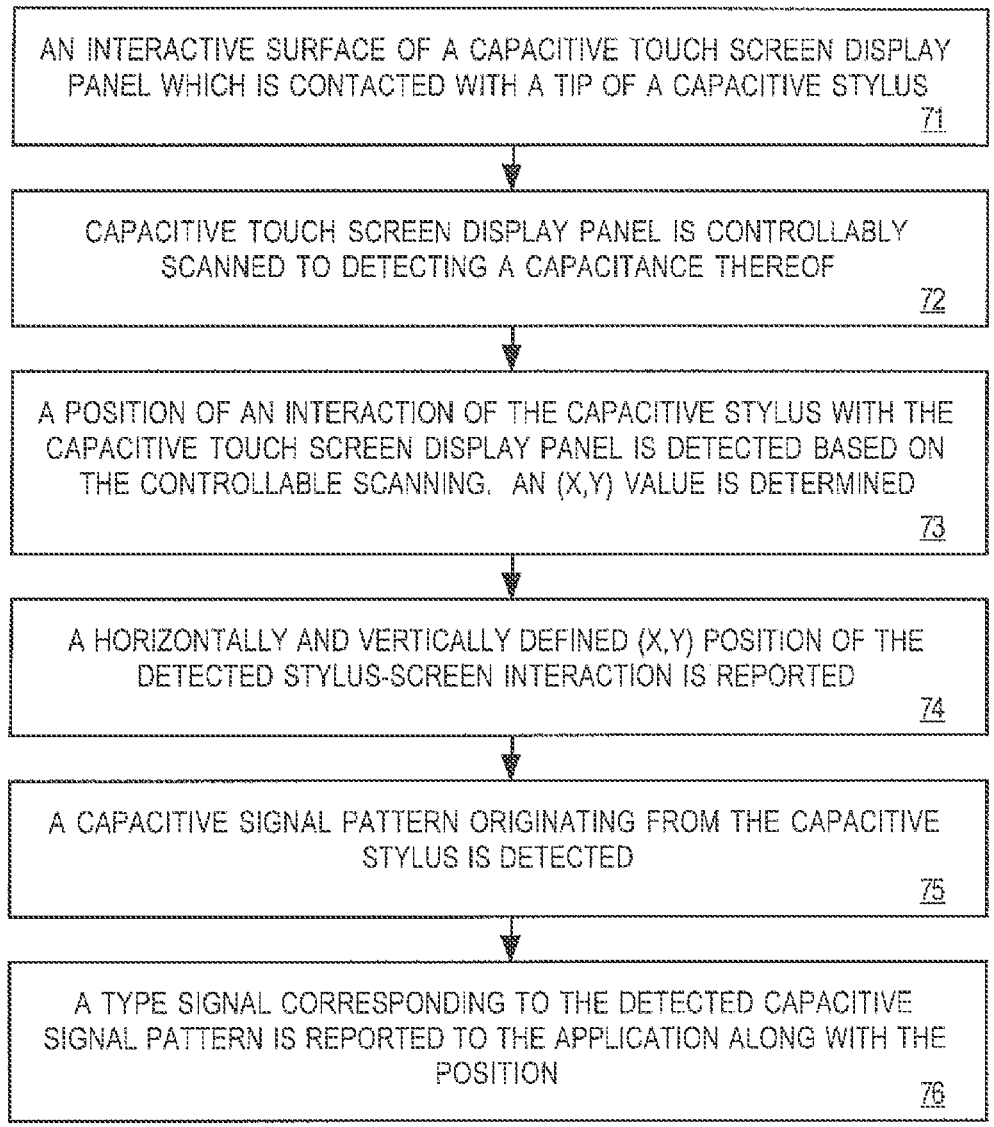
FIG. 7 depicts a flowchart for an example computer implemented process, according to an embodiment of the present invention.

FIG. 7 depicts a flowchart for an example computer implemented process 70, according to an example embodiment of the present invention. Process may comprise a computer implemented method for interfacing with an application running thereon.

In process step 71, an interactive surface of a capacitive touch screen display panel with is contacted with a tip of a capacitive stylus, which may affect an electrical, electrostatic and/or capacitive charge field of the surface.

In process step 72, the capacitive touch screen display panel is controllably scanned to detecting a capacitance thereof. In process step 73, a position of an interaction of the capacitive stylus with the capacitive touch screen display panel is detected based on the controllable scanning. An (x, y) value is determined.

In process step 74, a horizontally and vertically defined (x, y) position of the detected stylus-screen interaction is reported. In process step 75, a capacitive signal pattern originating from the capacitive stylus is detected. In process step 76; a type signal corresponding to the detected capacitive signal pattern is reported to the application along with the position.

The type signal corresponds to representing a color type or other operability value such as an erase function. The capacitive signal pattern may comprise a square wave of a prescribed duty cycle, or a square wave of a prescribed frequency but having a varying duty cycle. The detection of the capacitive signal pattern may include detecting an area of the interaction. The reporting the type signal may thus include reporting a magnitude corresponding to the detected interaction area.

The capacitive stylus is operable for changing a mode of operating based on a user input thereto. The reporting the type signal may thus include reporting a change in the detected capacitive signal pattern corresponding to the changing the operating mode.

Figure 8:
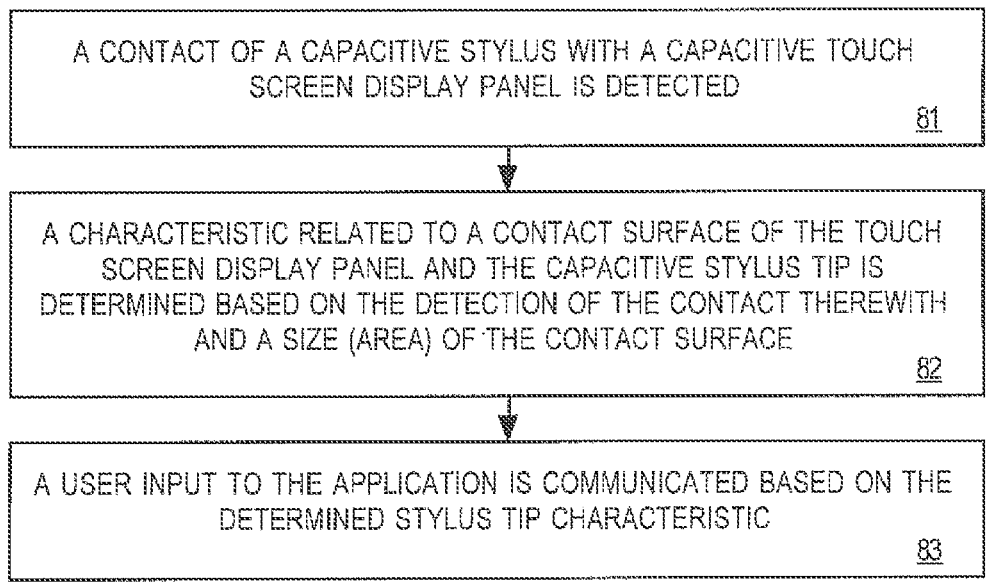
FIG. 8 depicts a flowchart for an example computer implemented process, according to an embodiment of the present invention.

FIG. 8 depicts a flowchart for an example computer implemented process 80 for interacting with an application running on a computer system, according to an embodiment of the present invention. In process step 81, a contact of a capacitive stylus with a capacitive touch screen display panel is detected.

In process step 82, a characteristic related to a contact surface of the touch screen display panel and the capacitive stylus tip is determined based on the detection of the contact therewith and a size (area) of the contact surface. In process step 83, a user input to the application is communicated based on the determined stylus tip characteristic.

Figure 9:
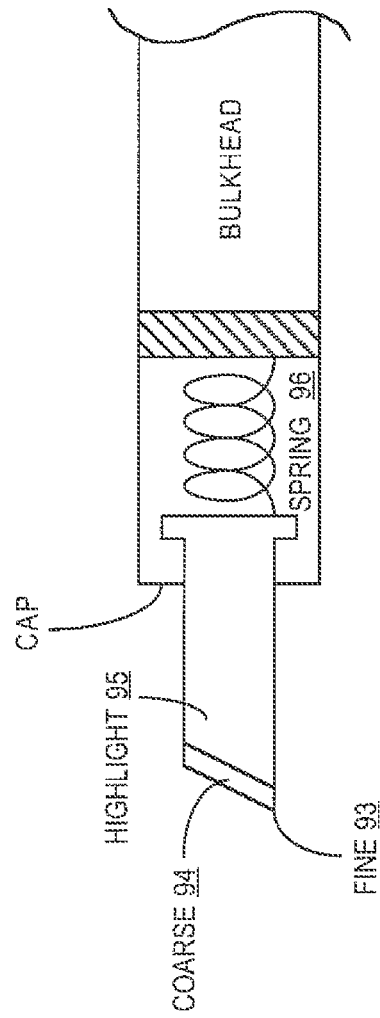
FIG. 9 depicts an example pen tip, according to an embodiment of the present invention.

FIG. 9 depicts an example stylus 90, according to an embodiment of the present invention. The stylus has a body 91 and a tip 92. A characteristic of the tip 92 may relate to a contour of the stylus tip, a shape of the stylus tip, a pattern of the stylus tip, a capacitance of the stylus tip, and/or a pressure of the stylus tip against the touch screen display panel surface.

The contour 91 of the stylus tip may comprise a fine contour and the communicated input relate to fine writing, using a movement of the stylus by the user upon the touch screen panel surface. The contour of the stylus tip may include a course contour 94 and the communicated input relate to course writing using a movement of the stylus by the user upon the touch screen display panel surface, or to a highlighting effect 95 using a movement of the stylus by the user upon the touch screen display panel surface.

The capacitive stylus comprise a body component 91 suitable for being hand held by the user as a writing instrument, wherein the tip 92 is disposed at an end of the body 91. A spring component 96 may be disposed within the body 91 for mechanically loading the pressure of the stylus tip 92 against the touch screen display panel surface responsive to a force applied by the user to the stylus body 91. The communicated input may thus include selecting a line thickness for writing upon the touch screen display panel surface.

The stylus tip 92 may be made from a deformable material such as conductive silicon. The pressure applied to the tip via the stylus results in compression of the tip and therefore an increase in the surface area contact. In this fashion, pressure can be detected and used to vary the line thickness of the resulting drawn line.

Figure 10:
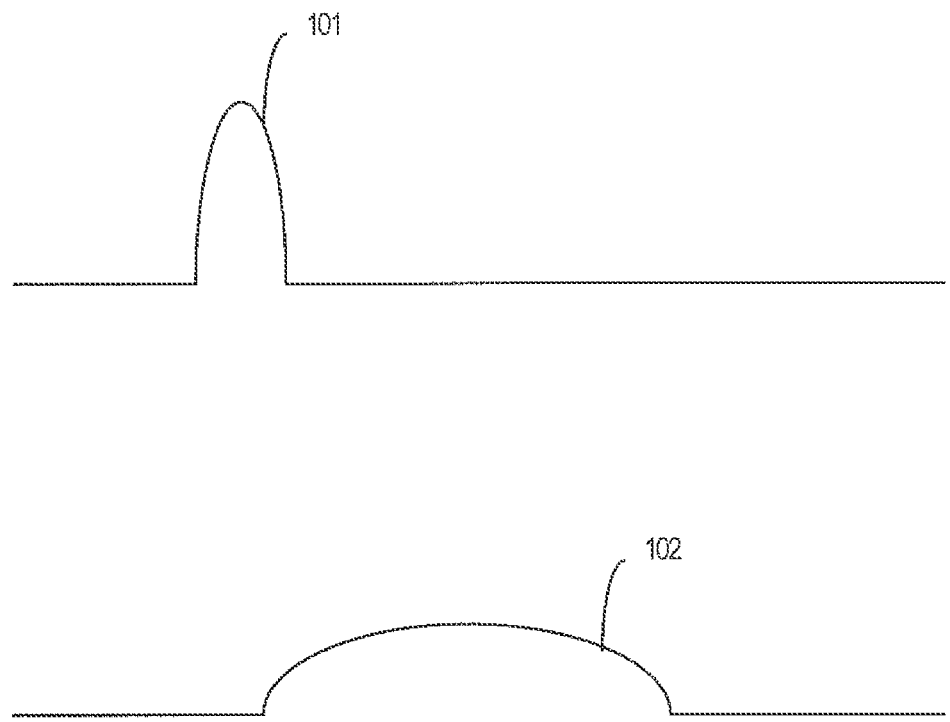
FIG. 10 depicts example signals, according to an embodiment of the present invention.

FIG. 10 depicts a set 100 of example waveforms, according to an example embodiment of the present invention. The example waveforms represent pressure via varying signals. A profile of the example waveforms in the set 100 correspond to capacitive signals that vary the level of pressure exerted by the stylus tip 92 to the touch screen display panel surface. The waveform profile 101 may thus correspond to a pressure level that is heavy in relation to the waveform profile 102, each of which may relate to separate type signals.

Figure 11:
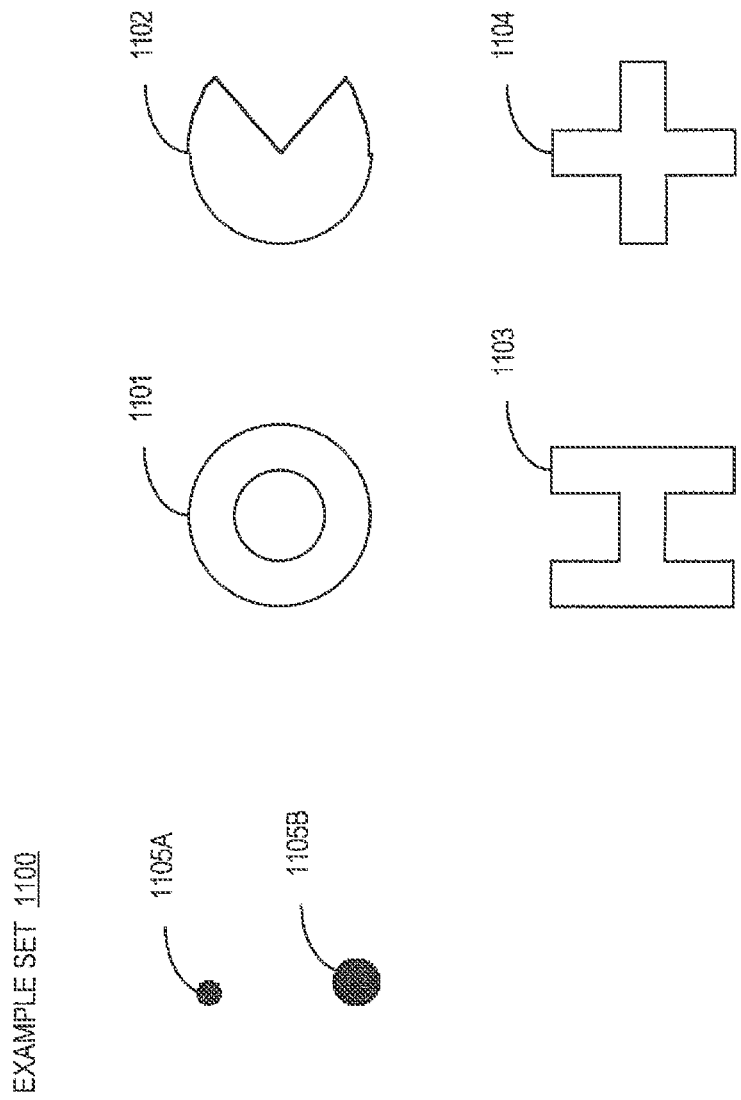
FIG. 11 depicts example pen tip shapes, according to an embodiment of the present invention.

FIG. 11 depicts an example set 1100 of pen tip shapes, according to an example embodiment of the present invention. The various shapes can be represented via a mixture of conductive and non-conductive material fabricated together in accordance to portions that comprise the given shape. The shape of the stylus tip may comprise a circle 1105A or 1105B (or ovoids, ellipses, etc.), each having different sizes, a torus ("doughnut") 1101, a sector (e.g., a "Pac-Man" style shape) 1102, a cross (×, +, etc.) 1104, and/or a pair of parallel bars joined at a midpoint of each by a perpendicular bar (H) 1103. Each of the shapes may input a different type signal than the other shapes when contacting the touch sensitive surface. These different shapes may involve different functionality when detected by the touch panel, e.g., erasure functionality.

Figure 12:
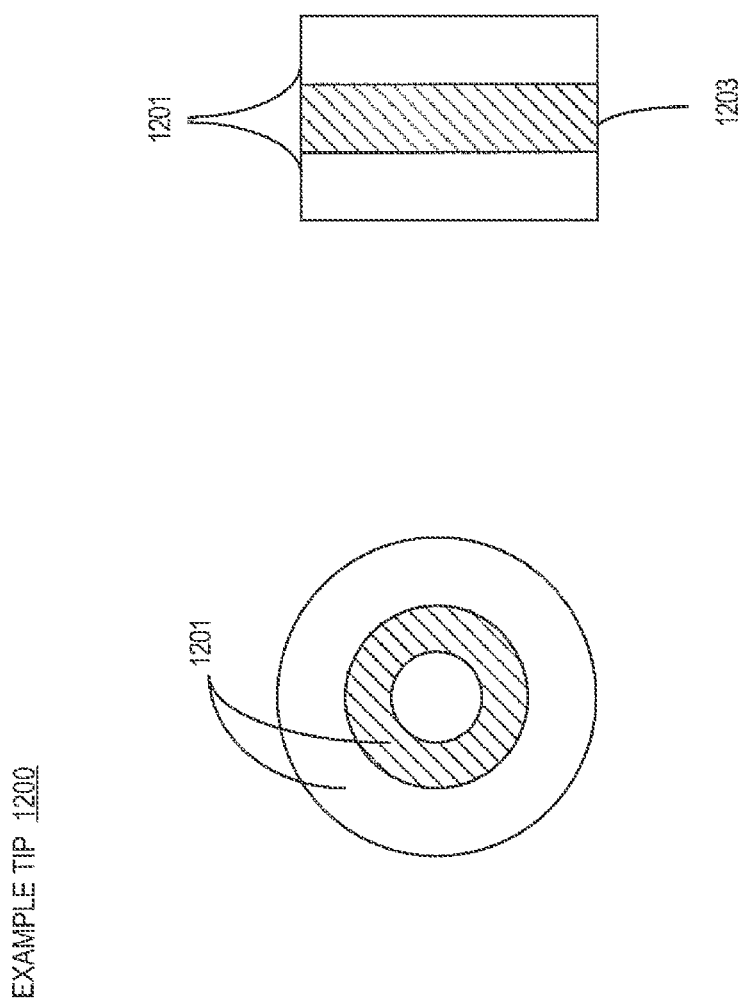
FIG. 12 depicts example pen tip shapes, according to an embodiment of the present invention.

FIG. 12 depicts an example set 1200 of pen tip shapes, according to an example embodiment of the present invention. The shape of the stylus tip may comprises a pair 1201 of concentric rings, in which an outer ring of the concentric pair of rings is conductive and an inner circle of the concentric pair of circles is nonconductive and concentrically surrounds a substantially central conductor. The communicated input may thus comprise an input relating to an eraser operation of the stylus. The shape of the stylus tip may also comprise a pair of parallel conductor bars 1202, each separated by an insulator or dielectric 1203. These "bar code" type tips can be effective as locks or keys, which may be used to lock or unlock a computer system by application of the array onto a designated area of a touch sensitive screen.

Figure 13:
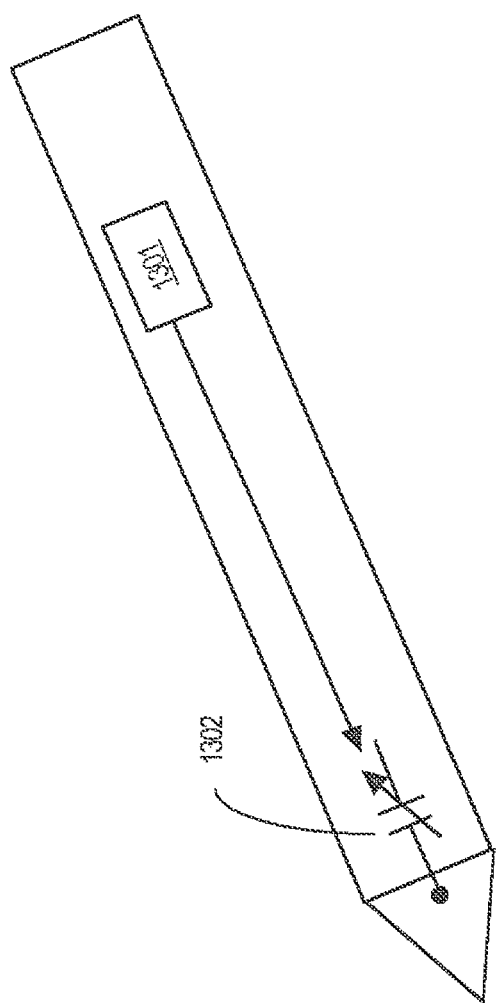
FIG. 13 depicts an example pen tip controller, according to an embodiment of the present invention.

FIG. 13 depicts an example capacitive stylus 1300, according to an example embodiment of the present invention. The capacitive stylus 1300 comprises an actuator component 1301 and a variable capacitor component 1302. The variable capacitor component 1302 is operable for controllably changing the capacitance of the stylus tip 1303 responsive to a manipulation by the user of the actuator component 1301. The communicated input may thus comprise a selection of a writing color based on a detected stylus tip capacitance.

Figure 14:
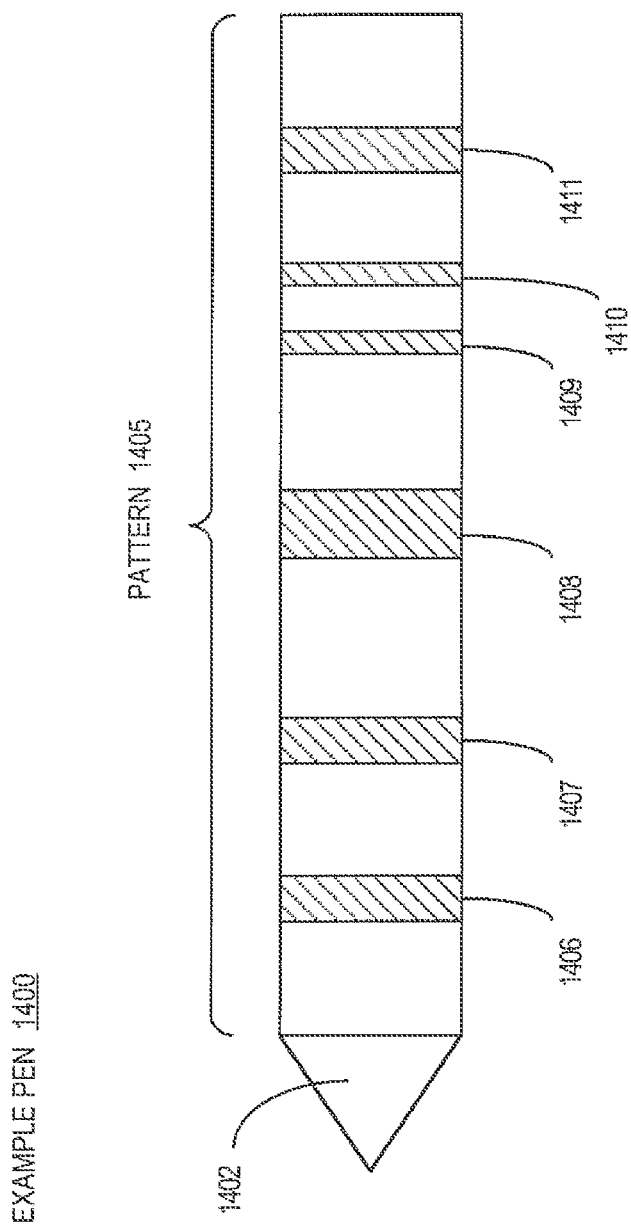
FIG. 14 depicts an example stylus, according to an embodiment of the present invention.

FIG. 14 depicts an example capacitive stylus 1400, according to an example embodiment of the present invention. The electronic stylus 1400 is operable for interacting with an application running on a computer system. The electronic stylus 1400 has a body 1401 suitable for being hand held as a writing instrument and comprising an insulating material.

The electronic stylus 1400 has a tip 1402 disposed at the end of the body 1401 for interfacing with a touch screen display panel of the computer system. The electronic stylus 1400 has a pattern comprising a plurality of (multiple) capacitive conductors 1406, 1407, 1408, 1409, 1410 and 1411 disposed in an array 1405 over the body 1401; any number of capacitive numbers may be included. Each of the multiple capacitive conductors 1406-1411, inclusive are insulated from each other by the insulating nonconductive material of the body 1401.

The touch screen display panel is operable for detecting a capacitive signature of the pattern 1405 when interacting with the touch screen display panel and is operable for interacting with an application running on a computer system by communicating a characteristic of the electronic stylus 1400 based on the detected capacitive signature.

The pattern 1405 may correspond to a particular size of the electronic stylus 1400, a particular shape of the electronic stylus 1400, and/or a particular type of the electronic stylus 1400.

The pattern 1405 may uniquely correspond to a key, e.g., bar code pattern, for operably unlocking a particular electronic stylus 1400, to a particular feature of the electronic stylus 1400 and/or to a particular identity of the electronic stylus 1400 or a user thereof.

Figure 15:
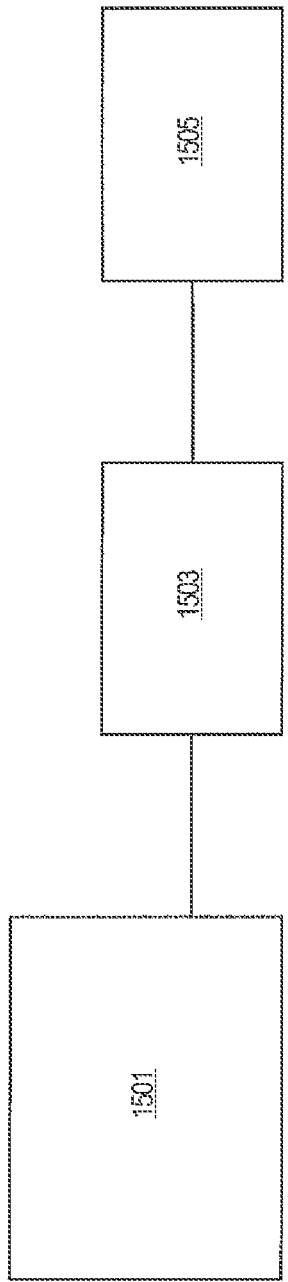
FIG. 15 depicts an example computer system, according to an embodiment of the present invention.

FIG. 15 depicts an example touch sensitive computer system 1500, according to an example embodiment of the present invention. Computer system 1500 has a capacitive touch screen display panel 1501. A controller 1503 is operable for scanning the capacitive touch screen display panel 1501 for detecting capacitance thereon and changes in the electric field associated with the panel caused by interactions with external capacitance sources.

For example, external objects that may touch (or closely approach) an outer surface of the capacitive touch screen display panel 1501 disturb the electrostatic field thereof. Control logic 1505 is coupled to the controller 1503 and operable therewith for detecting an interaction of an object with the capacitive touch screen display panel and responsive thereto for reporting a corresponding input to an application operable with the capacitive touch screen display panel relating to a characteristic of the object.

The characteristic of the object relates to a tip of the object. An example embodiment may be implemented in which the characteristic of the object relates to a characteristic of a tip of the object. The characteristic may relate to a contour of the tip, a shape of the tip, a conductive pattern on the tip of the object, a capacitance of the tip of the object, and/or a pressure of the tip of the object against a surface of the touch screen display panel 1501.

Figure 16:
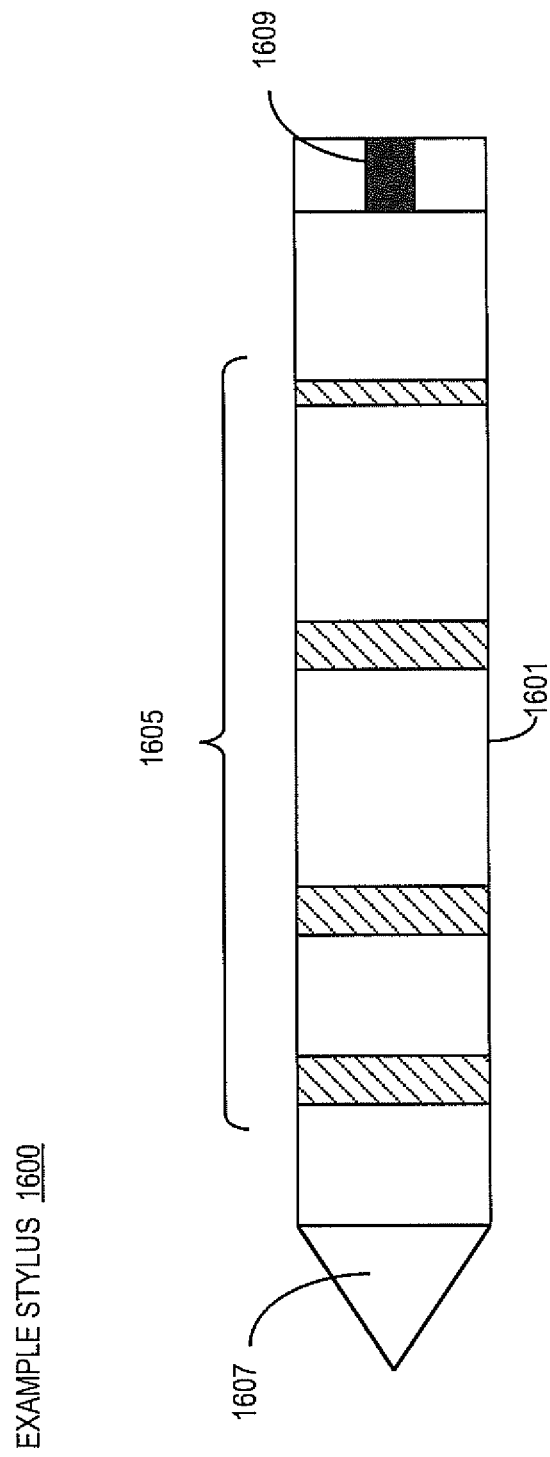
FIG. 16 depicts an example stylus, according to an embodiment of the present invention.

An example embodiment may be implemented in which the characteristic of the object relates to a body of the object. FIG. 16 depicts an example stylus object 1600, according to an example embodiment of the present invention. Stylus 1600 has a tip 1607 disposed at a first end of a body component 1601. The tip 1607 may be configured to be operated as a writing nib, brush and/or highlighting applicator. Stylus 1600 has a tip 1609 at a second end of the body component 1601, opposite from the first end. The tip 1609 may be of a unique shape or larger than the first tip and may be configured to be operated as an eraser.

The body 1601 comprises an insulating material with good dielectric properties such as a polymer, plastic, acrylic, ceramic, glass, carbon fiber reinforced polymer, wood or the like. A plurality of (multiple) capacitive conductors is disposed in an array or pattern 1605 over the body 1601. Each of the multiple capacitive conductors of the pattern 1616 is insulated from each other by the insulating material of the body 1601.

Each of the multiple capacitive conductors may be separated from one or more of the other capacitive conductors by a different amount or length of the insulating material to form a particular pattern 1605. Each of the multiple capacitive conductors may have matching or unique individual mass, size, thickness, contour, conductivity and/or capacitance properties. The particular form of pattern 1605 and the properties of each of the multiple conductors combine to present a certain capacitive signature. The touch screen display panel is operable for detecting the capacitive signature of the array of capacitive conductors.

The pattern 1605 may uniquely correspond to a particular size of the electronic stylus, a particular shape of the electronic stylus, a particular type of the electronic stylus, a particular feature of the electronic stylus, and/or a particular identity of the electronic stylus. Moreover, the pattern may uniquely correspond to a key for operably unlocking a particular electronic stylus or a particular feature thereof.

An example embodiment of the present invention described in relation to signaling touch screen enabled electronic devices thus increases the signaling operability of capacitive styli for actuating standard capacitive touch screen display panels without adding complexity to the interactive touch screen system or significant additional cost. An example embodiment of the present invention provides a capacitive stylus, which is inexpensive relative to typical active styli and configurably operable for interacting with a capacitive touch screen display over multiple independently selectable features without an intermediating communication device. An example embodiment of the present invention provides a touch sensitive interactive system in which user inputs from an inexpensive capacitive stylus are made without intermediating communication to a touch screen display device for selectively engaging various independently available operability features of the stylus.

Thus, an example embodiment of the present invention is described in relation to signaling touch screen enabled electronic devices with a capacitive electronic stylus having a body suitable for being hand held as a writing instrument. The body has a tip for interfacing with a capacitive touch screen display panel of a computer system. The electronic stylus has an insulator, which insulates electrical capacitance of the stylus body. The insulator is disposed near the tip of the stylus. A switch unit selectively couples the tip to the remaining parts of the stylus body. A controller component controls the switch unit. A mode selector is disposed on the body. The mode selector is responsive to being pressed by a user's finger to signal the controller for selecting one of multiple modes. The controller is configured to enter the selected mode responsive to the mode selector. The controller is configured to control the switch unit to switch in accordance with different signal patterns depending on a mode entered by the controller.

Definitions that are expressly set forth in each or any claim specifically or by way of example herein, for terms contained in relation to features of such claims are intended to govern the meaning of such terms. Thus, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A capacitive stylus comprising:
    a body suitable for being hand held as a writing instrument, the body comprising a tip for interfacing with a touch panel;
    an insulator for insulating capacitance of the body, wherein the insulator is disposed near the tip;
    a switch unit for selectively coupling the tip to a remainder portion of the body;
    a controller for controlling the switch unit; and
    a mode selector disposed on the body, the mode selector responsive to a user press thereof to signal the controller, wherein the controller is configured to enter one of a plurality of modes responsive to the mode selector wherein the controller is configured to control the switch unit to switch in accordance with different capacitive signal patterns depending on a mode entered by the controller; and
    an array of a plurality of insulated capacitive conductors disposed over the body, wherein a pattern of the array has a matching capacitance property that corresponds to a characteristic of the capacitive stylus, and at least aspects of the pattern of the array are selectively couplable to the tip through employment of the mode selector.

2. The capacitive stylus as described in claim 1 wherein the plurality of modes corresponds to a plurality of different color representations.

3. The capacitive stylus as described in claim 1 wherein the plurality of different capacitive signal patterns comprise square signal waves that vary by duty cycle.

4. The capacitive stylus as described in claim 1 wherein the plurality of different capacitive signal patterns comprises square signal waves that vary by frequency.

5. The capacitive stylus as described in claim 1 wherein the mode selector comprises a mechanical button.

6. The capacitive stylus as described in claim 1 further comprising a display housed on the body, the display for displaying an indicator representative of a current mode of the controller.

7. A touch sensitive system comprising:
    a capacitive touch panel;
    a controller coupled to scan the capacitance touch panel for detecting capacitance thereof; and
    control logic coupled to the controller for detecting a position of an interaction of an object with the capacitive touch panel and responsive thereto for reporting a corresponding (x, y) position thereof, the control logic in combination with the controller operable to detect a capacitive signal pattern originating from the object and responsive thereto for reporting a type signal corresponding thereto,
    the control logic further configured to determine, from the capacitive signal pattern, a matching capacitance property of the object itself which is in at least part derived from a pattern of an array of a plurality of insulated capacitive conductors disposed over the body of the object, which corresponds to a characteristic of the object.

8. The touch sensitive system as described in claim 7 wherein the type signal comprises a color type.

9. The touch sensitive system as described in claim 7 wherein the capacitive signal pattern comprises a square wave of a prescribed duty cycle.

10. The touch sensitive system as described in claim 7 wherein the capacitive signal pattern comprises a square wave of a prescribed frequency.

11. The touch sensitive system as described in claim 7 wherein the control logic in combination with the controller are operable to detect an area of the interaction and responsive thereto for reporting a magnitude corresponding thereto.

12. The touch sensitive system as described in claim 7 further comprising:
 a processor;
 a memory coupled to the processor; and
 an operating system resident in the memory and executed by the processor, wherein the control logic reports the (x, y) position and the type signal to the operating system.

13. A computer implemented method for interfacing with an application running thereon, the method comprising:
 controllably scanning the capacitive touch screen display panel for detecting a capacitance thereof;
 detecting a position of an interaction of a tip of a capacitive stylus with the capacitive touch screen display panel based on the controllably scanning;
 reporting a (x, y) position of the position of the interaction;
 detecting a capacitive signal pattern originating from the tip of the capacitive stylus;
 responsive to the capacitive signal pattern, reporting a type signal corresponding to the detected capacitive signal pattern to the application, and
 determining a property of the capacitive stylus itself based on a matching capacitive signal of the detected capacitive signal pattern, wherein the detected capacitive signal pattern is derived at least in part a pattern of an array of a plurality of insulated capacitive conductors disposed over the body of the stylus.

14. The computer implemented method as recited in claim 13 wherein the type signal comprises a color type.

15. The computer implemented method as recited in claim 13 wherein the capacitive signal pattern comprises a square wave of a prescribed duty cycle.

16. The computer implemented method as recited in claim 13 wherein the capacitive signal pattern comprises a square wave of a prescribed frequency.

17. The computer implemented method as recited in claim 13 wherein the detecting a capacitive signal pattern comprises detecting an area of the interaction.

18. The computer implemented method as recited in claim 17 wherein the reporting the type signal comprises reporting a magnitude corresponding to the detected interaction area.

19. The computer implemented method as recited in claim 13 wherein the capacitive stylus is operable for changing a mode of operating based on a user input thereto.

20. The computer implemented method as recited in claim 19 wherein the reporting a type signal comprises reporting a change in the detected capacitive signal pattern corresponding to the changing the operating mode.

* * * * *